United States Patent
Ericson et al.

(10) Patent No.: US 8,576,936 B2
(45) Date of Patent: Nov. 5, 2013

(54) METHOD AND APPARATUS FOR HIGH SPEED DATA TRANSMISSION MODULATION AND DEMODULATION

(75) Inventors: Daniel Wayne Ericson, Hollis, NH (US); Jun Ni, Liberty Lake, WA (US); Liang Ban, Burlington, MA (US); Brett L. Hansmeier, Manchester, NH (US); Yuan Chen, Lexington, MA (US)

(73) Assignee: Harris Corporation, Melbourne, FL (US)

( * ) Notice: Subject to any disclaimer, the term of this patent is extended or adjusted under 35 U.S.C. 154(b) by 769 days.

(21) Appl. No.: 12/692,987

(22) Filed: Jan. 25, 2010

(65) Prior Publication Data
US 2011/0182332 A1 Jul. 28, 2011

(51) Int. Cl.
*H04L 5/12* (2006.01)
(52) U.S. Cl.
USPC ........... 375/262; 375/259; 375/260; 375/295; 375/316
(58) Field of Classification Search
USPC ......... 375/262, 261, 259, 260, 295, 316, 203; 371/203
See application file for complete search history.

(56) References Cited

U.S. PATENT DOCUMENTS

| | | | |
|---|---|---|---|
| 6,618,352 B1* | 9/2003 | Shirakata et al. | 370/203 |
| 2002/0105109 A1* | 8/2002 | Hsieh | 264/140 |
| 2006/0120272 A1* | 6/2006 | Wang et al. | 370/208 |
| 2007/0206686 A1* | 9/2007 | Vook et al. | 375/260 |
| 2007/0280365 A1* | 12/2007 | Seki | 375/260 |
| 2008/0013654 A1 | 1/2008 | Rick et al. | |
| 2008/0089286 A1 | 4/2008 | Malladi et al. | |
| 2008/0165893 A1 | 7/2008 | Malladi et al. | |
| 2009/0122771 A1* | 5/2009 | Cai | 370/338 |
| 2009/0279589 A1* | 11/2009 | Nguyen | 375/141 |
| 2010/0246378 A1* | 9/2010 | Vujcic et al. | 370/210 |

OTHER PUBLICATIONS

Myung, Hyung G., et al., "Single Carrier FDMA for Uplink Wireless Transmission", IEEE Vehicular Technology Magazine, Sep. 2006, pp. 30-38.

* cited by examiner

*Primary Examiner* — Zewdu Kassa
(74) *Attorney, Agent, or Firm* — Fox Rothschild, LLP; Robert Sacco

(57) ABSTRACT

A method and apparatus for communicating wirelessly comprising creating a plurality of sub-carrier signals by quadrature amplitude modulating data onto a plurality of sub-carrier frequencies spaced apart by a sub-carrier frequency spacing interval, frequency shifting the sub-carrier signals by one half of the sub-carrier frequency spacing interval, and modulating the sub-carrier signals onto a radio frequency carrier wave for wireless transmission.

27 Claims, 5 Drawing Sheets

METHOD AND APPARATUS FOR HIGH SPEED DATA TRANSMISSION MODULATION AND DEMODULATION

BACKGROUND

The invention pertains to radio frequency (RF) wireless data transmission.

There are many different techniques and protocols for modulating data onto carrier frequencies for radio transmission. With the ever-increasing number of wireless transmitters and receivers sharing the limited available bandwidth, radio system manufacturers are always looking for techniques to increase data transmission rates so as to maximize the numbers of communication channels available within a frequency band and to maximize the baud rate of each channel.

For instance, GMSK (Gaussian Filtered Minimum Shift Keying) is the modulation technique used in GSM (Global System for Mobile Communications). It has many advantages, including spectral efficiency and constant envelope modulation. That is, the amplitude of the signal is essentially fixed, such that it has a zero Peak-to-Average Power Ratio (PAR). Accordingly, it is particularly suitable to mobile applications such as cellular telephones because the amplifiers for radios used in such systems need to operate efficiently only within a very narrow power range and can therefore be made small and lightweight. However, one significant disadvantage of GMSK is that the baud rate must be much lower than the Nyquist rate.

QAM (Quadrature Amplitude Modulation) is another modulation technique used in many radio systems. QAM has the advantages of being able to support a baud rate close to the Nyquist rate. However, it has the disadvantage of being a phase and amplitude modulation technique. Therefore, it has a high PAR, thus requiring the use of more sophisticated amplifiers that can operate efficiently over a relatively broad amplitude range. Multi-carrier QAM modulation techniques, such as OFDM, for instance, have a PAR in the range of 10 to 1 or greater. This generally requires an amplifier to be bulkier and, therefore, disadvantageous particularly in connection with mobile applications.

In LMR, most older systems tend to employ constant envelope modulation techniques because of its power efficiency. But these techniques are not bandwidth efficient. Therefore, newer LMR systems tend to use non-constant envelope waveforms such as QAM or multicarrier waveforms of various types.

Conventional single-carrier QAM systems tend to suffer from ISI (Inter-Symbol Interference) resulting from propagation channel factors such as Doppler shift, multipath interference, and distortion. These systems typically utilize adaptive equalizers in the receiver to compensate for the effects of the propagation channel. The non-stationary nature of the propagation channel, particularly in mobile applications such as police car radios or personal radio systems worn by persons who are running or riding in a car, has proven challenging.

Multi-carrier modulation techniques have been introduced to divide the propagation channel into smaller segments so that channel impairments can be handled discretely in narrower bands and treated as constant across these narrower bands. These narrow segments are less complex to equalize using frequency domain equalization. However, multi-carrier waveforms have high PAR. A radio operating in a system with an exemplary PAR of 10 dB must be capable of generating signals having amplitudes that are ten times the average power of the waveform. Accordingly, they require higher power amplifiers that can be physically large.

Recently, a new type of modulation technique known as SC-FDMA (Single Carrier-Frequency Division Multiple Access) has shown promise. See for instance: Hyung G. Myung, "Single Carrier FDMA for Uplink Wireless Transmission," IEEE Vehicular Technology Magazine, September 2006. SC-FDMA is an OFDM (Orthogonal Frequency Division Multiplexing) technique. OFDM is a technique suitable for broadband data communication. Since its original introductory in the 1960's, OFDM has been widely adopted for broadband wireless communication systems, such as WiFi and WiMAX. The key concept of OFDM is multi-carrier modulation. The sub-carriers are orthogonal to each other for maximum efficiency. The orthogonal multi-carrier modulation can be performed efficiently by using an IFFT (Inverse Fast Fourier Transform) algorithm. The bandwidth or spacing of these sub-carriers is small enough that the RF channel can be considered constant. Hence, a simple channel equalization scheme can be used. OFDM symbols often includes a CP (cyclical prefix) to absorb ISI (inter symbol interference). The weakness of conventional OFDM is the high PAR (peak to average ratio). The OFDM waveform has a PAR around 10 dB.

On the other hand, SC-FDMA, which is also called DFTS-OFDM (Discrete Fourier Transform Spread OFDM), has relatively lower PAR than OFDM and is easily equalized in wide band applications, such as cellular telephone applications, where channel bandwidths are measured in MHz. Compared to conventional OFDM, SC-FDMA adds a DFT spreading block before the IFFT when generating the waveform.

The sub-carrier spacing and CP length are key to implementing OFDM or SC-FDMA in wideband applications to minimize PAR and ISI. Normally, these two parameters are set as a function of coherent channel bandwidth and delay spread. Sub-carrier spacing typically is set to be roughly equal to coherent bandwidth, and CP is set large enough to absorb delay spread. In both cases, the sub-carrier spacing is based on the coherent channel bandwidth, and the CP length is based on delay spread.

However, these implementation techniques do not apply to narrowband wireless communication. For example, in a narrowband wireless channel of 25 KHz, a normal OFDM or SC-FDMA waveform would have only two sub-carriers. Such a waveform cannot meet a typical spectrum mask or ACP requirement for such a channel. However, in narrow band radio systems, such as many LMR systems, where the channel bandwidth typically is about 12.5 KHz or 25 KHz, or about $\frac{1}{50}^{th}$ the channel bandwidth of typical cellular telephone systems, it is much more difficult to apply the conventional SC-FDMA techniques for minimizing ISI and PAR.

SUMMARY OF THE INVENTION

In accordance with at least one aspect, methods and apparatus are disclosed for communicating wirelessly comprising creating a plurality of sub-carrier signals by quadrature amplitude modulating data onto a plurality of sub-carrier frequencies spaced apart by a sub-carrier frequency spacing interval, frequency shifting the sub-carrier signals by one half of the sub-carrier frequency spacing interval, and modulating the sub-carrier signals onto a radio frequency carrier wave for wireless transmission.

DETAILED DESCRIPTION OF THE INVENTION

Figure 1:
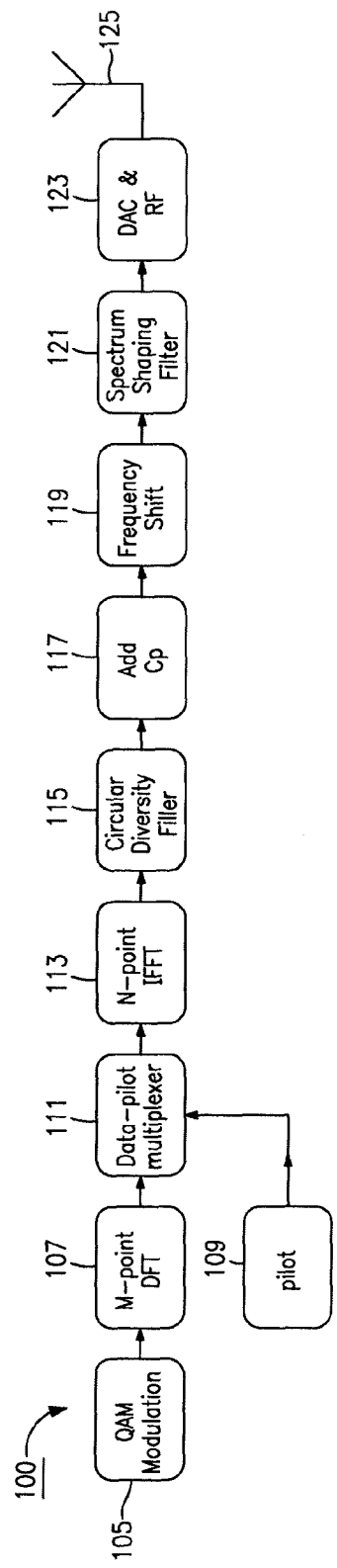
FIG. 1 a block diagram illustrating the components of an SC-FDMA transmitter in accordance with the principles of the present disclosure.

FIG. 1 and the other block diagrams in this specification are functional block diagrams in which each block represents a function performed as part of the transmission process between the presentation of the actual data to be transmitted 102 and the wireless transmission of the date via antenna 125. The functions represented by the blocks may be performed by hardware and/or software in manners that would be well known to persons familiar with the art of wireless communications. The separate blocks do not necessarily correspond to different hardware or software, but represent functions irrespective of the actual physical component that performs the function. For instance, much of the functionality performed in the digital domain may be performed by a microprocessor running software. This might include some of the functions described hereinbelow such as Fourier transformation, inverse Fourier transformation, and circular diversity filtering. Other functions may more likely be performed by hardware, such as multiplexing, filtering, equalizing, converting between the digital and analog domains, and modulating between baseband and RF.

In the following discussion, a typical physical embodiment of a structure for performing a particular function may be mentioned merely for exemplary, non-limiting purposes. Generally, most if not all of the function discussed hereinbelow could be performed in a variety of ways using a variety of physical components, including, but not limited to software running on a processor, a microprocessor, or a digital signal processor, digital hardware, such as combinational logic circuits, digital signal processors, state machines, integrated circuits (including field programmable gate arrays (FPGAs) and application specific integrated circuits (ASICs)), analog circuits, and/or combinations thereof.

In wireless communication systems that have a large number of base stations and a large number of transmit/receive units, such as a typical cellular telephone network, the limiting factor in terms of communication quality typically is inter-channel interference and co-channel interference. However, in systems that have a relatively small number of users and base stations in which there may be one or two antennas and a very limited number of users, such as LMR systems, the limiting factor typically is noise.

FIG. 1 is a block diagram illustrating the primary components of a multi-carrier SC-FDMA transmitter 100 in accordance with the present disclosure that is particularly suited, but not limited to, wireless communication systems that have narrow channel bandwidths, such as many LMR systems. Particularly, first, the digital data to be transmitted (which may be voice data) is broken up into discrete blocks and modulated using quadrature amplitude modulation as shown in block 105. The functions of block 105 typically might be performed by some form of a digital data processor, such as a microprocessor or a DSP. The QAM-modulated data is then converted to the frequency domain using an M point DFT (Discrete Fourier Transform) 107, where M is an integer equal to the desired number of symbols within the duration of the block. This also may be performed in any reasonable digital processing device.

A pilot signal 109 is then combined with the data in the frequency domain in, for instance, a suitable multiplexer 111.

As is well known, the pilot signal can then be observed by the receiver at the receiving end to determine the channel gain so that the receiver can correctly equalize the received signal as a function of the channel gain. More particularly, the pilot signal 109 comprises a known signal transmitted from the transmitting device to the receiving device along with the actual data that the receiving device can analyze to determine the gain effect of the channel on the known pilot signal. The pilot signal may be stored in a memory such as RAM or ROM. The receiver can then equalize the received data portion of the transmission to compensate for the effect of the propagation channel gain.

The longer the pilot data is within a transmission block, the higher the accuracy of the determination of the channel gain (and, consequently, the better the channel communication quality). However, the longer the pilot data per block, the fewer the number of bits per block available for the actual data being transmitted. Accordingly, a tradeoff needs to be made between data transmission rate and the accuracy of the channel gain estimation. A pilot signal with a unique structure is introduced herein that provides excellent accuracy in determining channel gain with very low overhead (i.e., few pilot bits).

Figure 3A:
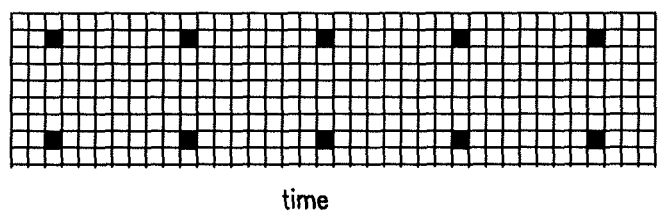
FIG. 3A is a diagram illustrating a conventional pilot data structure.
Figure 3B:
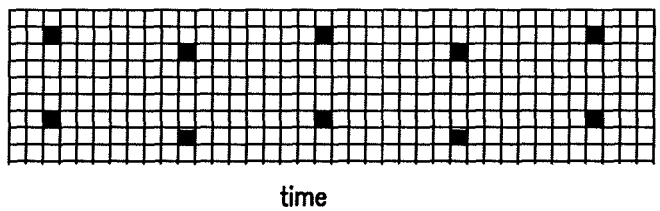
FIG. 3B is a diagram illustrating a pilot data structure in accordance with one aspect of the present disclosure.

FIGS. 3A and 3B helps illustrate this pilot structure. Normal pilot structure of OFDM or SC-OFDM waveform is designed around coherent channel bandwidth and coherent time, as shown in FIG. 3A, in which each row represents a different sub-carrier and each block in each row represents an OFDM symbol. According to a conventional pilot bit scheme as illustrated in FIG. 3A, a pilot bit is inserted every few symbols that will be used by the receiver to determine channel gain. As illustrated, pilot bits may be provided in widely spaced apart sub-carriers because the channel response may be different for two sub-carriers that are far apart in frequency.

An example of the new pilot structure is illustrated in FIG. 3B, in which the pilot signal alternates between adjacent sub-carriers. This arrangement can facilitate phase adjustment.

Particularly, in narrow band systems, the sub-carrier spacing is much smaller than the coherent channel bandwidth. By alternating the sub-carrier frequency within which a pilot bit appears, one can use the pilot bits at the receiver to time synchronize the channel as well as gain synchronize the channel. By switching between two sub-carriers that are close to each other in frequency (e.g., adjacent sub-carrier frequencies), it can be assumed that the channel gain response is the same for both sub-carriers. Hence, the phase of the channel response is affected only by time offset. By having pilots in adjacent channels, the receiver can extract the phase difference of the channel response of adjacent sub-carriers and then use that information to perform time synchronization adjustment in the time domain or phase adjustment in the frequency domain.

In the illustrated embodiment shown in FIG. 3B, every other pilot bit is alternated between two adjacent sub-carrier frequencies. However, this is merely exemplary. While the closer the two frequencies are to each other, the better the assumption that the channel response is the same at both of those frequencies, adjacency is not per se a requirement. Furthermore, again, the closer in time the two pilot bits in different channels are to each other, the better the assumption that the channel response is the same for both. However, alternating every other pilot bit between channels also is not a per se requirement. Even further, one may alternate between three or even more channels if desired. For instance, the first pilot bit may be placed in one sub-carrier, the next pilot bit may be placed in the next adjacent sub-carrier with a higher frequency, and the third pilot bit may be placed in the next adjacent carrier with a lower frequency that the first sub-carrier. Any number of variations is possible.

After the pilot signal and data signal have been combined in the multiplexor 111, the combined signal is converted back to the time domain using an N-point iFFT (inverse Fast Fourier Transform) 113, where N=M+L and M is number of data points and L is number of pilot points. Again, this function typically might be performed by a DSP or a programmed microprocessor.

Next, assuming a multiple antenna system, the time domain signal is passed through a circular diversity filter 115 that performs circular convolution of the symbols to generate frequency diversity. This may be a digital filter (e.g., this function may be performed by software running on some form of digital processor). A circular diversity filter increases the frequency diversity of the signal by performing circular convolution of the symbols with a diversity filter to generate frequency diversity. See, for instance, Wu, G. et al., Circular shifted transmit diversity, Wireless Communications & Mobile Computing, Vol. 15, Issue 4, pp. 491-496 (August 2005), which relates to circular diversity filtering in a multiple antenna environment. The circular diversity filter may be omitted in single antenna systems, as it would provide no beneficial effect in a single antenna system. Particularly, in RF transmissions, and especially in mobile applications, it is not uncommon for a received sub-carrier signal to suffer from significant and variable dropout as a function of frequency and/or time. For instance, at any given instant, the signal at one sub-carrier frequency in the channel may be received clearly, whereas the signal at another sub-carrier frequency within the channel may be received very poorly or not at all. The signal dropout also may vary significantly as a function of time. In situations where a mobile radio is moving at a high rate of speed, such as in a moving motor vehicle, the dropout can change as rapidly as a hundred times per second or more. By increasing the frequency diversity of the signal within the channel, the effect of this phenomenon can be spread out among the plurality of sub-carriers in the channel. Particularly in connection with voice communications, it is often considered preferable for the quality of all of the voice channels to be slightly reduced rather than for one or a few of the channels to have extremely low or no quality, whereas other channels have extremely high quality.

Figure 4:
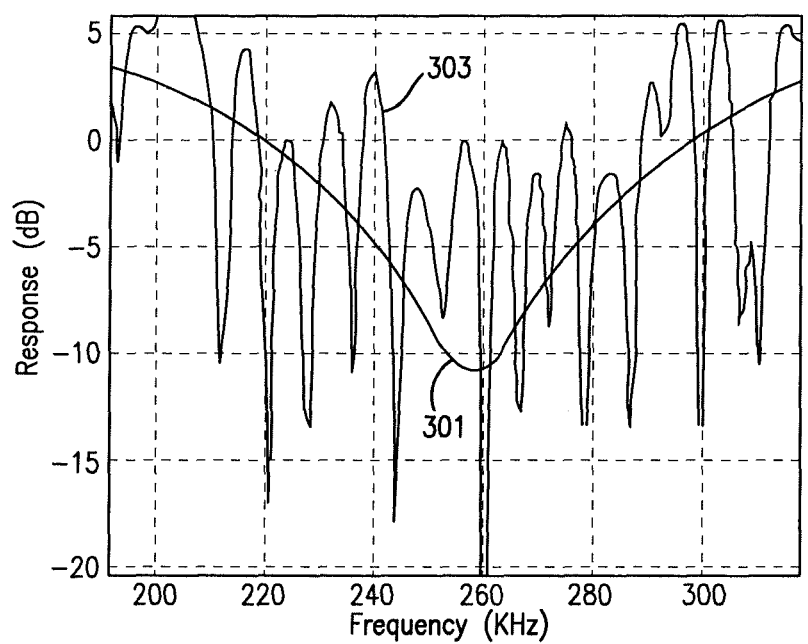
FIG. 4 is a graph illustrating the effect of circular diversity filtering in accordance with one aspect of the present disclosure.

FIG. 4, for instance, illustrates the effect that an exemplary circular diversity filter would have on a signal. This graph shows signal response in dB's as a function of frequency for a given signal both without circular diversity filtering (line 301) and with circular diversity filtering (line 303). As can be seen, without circular diversity filtering, this channel has a deep valley centered at around 250 KHz. However, with circular diversity filtering applied, the response dropout is spread much more widely between 200 and 300 KHz.

The length of the circular filter should not exceed the length of one SC-FDMA symbol. The length of the circular filter should be set as a function of channel bandwidth and delay spread.

Returning to FIG. 1, after circular diversity filtering, a cyclical prefix is added to the signal in block 117. This is common in OFDM (Orthogonal Frequency Division Multiplexing) and essentially comprises copying the end of a given data block to the beginning of the block to help minimize ISI (Inter Symbol Interference) as is well known. This function typically might be performed using a DSP or microprocessor running suitable software. However, it could also be performed by other means, such as combinational logic, an ASIC, a multiplexer, etc.

Next, in block 119, a frequency shift is applied to all of the sub-carrier frequencies. Specifically, all of the sub-carriers are shifted in frequency by an amount equal to one-half of the sub-carrier spacing. Thus, for instance, if a channel is 25 KHz wide, and comprises ten sub-carrier frequencies evenly spread out through the channel, then the sub-carrier frequency spacing will be 2.5 KHz. These functions may be performed by a suitable DSP or a programmed microprocessor.

In OFDM, the multiple carriers are generated in the frequency domain using fast Fourier transform techniques (FFT). FFT requires that there be an even number of frequency bins, and, therefore, an even number of subcarriers. However, the subcarriers are not symmetric about DC (0 Hz). Particularly, of the even number of subcarriers, one of them is at DC. Accordingly, five of them may be offset positively from DC, e.g., at 2.5 KHz, 5 KHz, 7.5 KHz, 10 KHz, and 12.5 KHz, and four of them may be offset negatively from DC, e.g., at −2.5 KHz, −5 KHz, −7.5 KHz, and −10 KHz. In order to attain symmetry, which is desirable for the inverse FFT process that is to be performed at the receiver, broadband applications of SC-FDMA often simply discard some of the subcarriers. However, this may not always be desirable. For instance, in narrow band applications, there may be so few subcarrier frequencies that discarding one of the subcarriers may result in a substantial reduction in communication throughput.

Thus, rather than discarding one of the subcarriers, all of the subcarriers may be frequency shifted by one-half of the subcarrier frequency spacing in order to attain symmetry about DC.

Thus, in the above example having a 25 KHz channel with ten subcarrier frequencies, the offset applied to the subcarrier baseband frequencies would be one half of 2.5 KHz, or 1.25 KHz, thereby providing disposed at center frequencies of −11.25 KHz, −8.75 KHz, −6.25 KHz, −3.75 KHz, −1.25 KHz, +1.25 KHz, +3.75 KHz, +6.25 KHz, +8.75 KHz, and +11.25 KHz.

The frequency shift is performed in the digital domain before the signal is converted to analog for modulation onto the RF carrier frequency.

Next, the frequency-shifted baseband signal is passed through a spectrum-shaping filter 121. Again, since, in this embodiment, the signal is still in the digital domain at this stage, these functions may be performed, for instance, by a DSP or a suitably programmed microprocessor.

The Federal Communications Commission (FCC) in the United States and other regulatory bodies throughout the world generally have strict regulations concerning residual transmitter energy outside of a specified frequency band. These rules either take the form of a spectral mask or ACP (Adjacent Coupled Power) bins, both of which require waveforms to have a very tightly-contained spectrum of energy.

The spectrum-shaping filter 121 contains the signal energy within the operating channel. The symmetry around DC provided by the aforementioned half subcarrier spacing frequency offset in block 119 simplifies the design of this spectrum-shaping filter.

Normally, single carrier waveforms need to use ISI-free filters for the shaping filter. Accordingly, the digital filter must meet the Nyquist condition. However, SC-FDMA waveforms have an OFDM structure and have a GI (Guard Interval) to absorb ISI. Accordingly, this shaping filter can be any reasonable FIR (Finite Impulse Response) filter. Thus, efficiency is improved because the filter may have fewer taps.

The quality of OFDM or SC-FDMA in narrowband wireless communication is dependent on the determination of the specific parameters and values set for the spectrum shaping filter, sub-carrier spacing, and CP length.

In accordance with one scheme for determining these values, the channel coherent bandwidth and coherent time are first determined to decide the range of the sub-carrier spacing wherein:

Coherent bandwidth>sub-carrier spacing>1/(coherent time)

For example, if a wireless system has a coherent bandwidth of 10 KHz and coherent time of 1 ms, in accordance with the above restrictions, the sub-carrier spacing can range from 1 KHz to 10 KHz. Coherent time is the time that the channel condition remains constant or close to constant.

Thus, for example, for a 25 KHz channel bandwidth, the following sub-carrier spacings and numbers of sub-carriers are candidates:

| 2 sub-carriers | sub-carrier spacing is 8 KHz |
| 4 sub-carriers | sub-carrier spacing is 4 KHz |
| 8 sub-carriers | sub-carrier spacing is 2 KHz |
| 16 sub-carriers | sub-carrier spacing is 1 KHz |

The number of subcarriers need not be a power of 2, but powers of 2 are convenient for purposes of the FFT calculation. For instance, it would be possible to select a number of frequency bins that is not a power of 2, e.g., 6, 10, 12, 14, and perform the FFT calculation with a number of frequency bins that is a power of 2 and place zeros in the unused bins.

Figure 6:
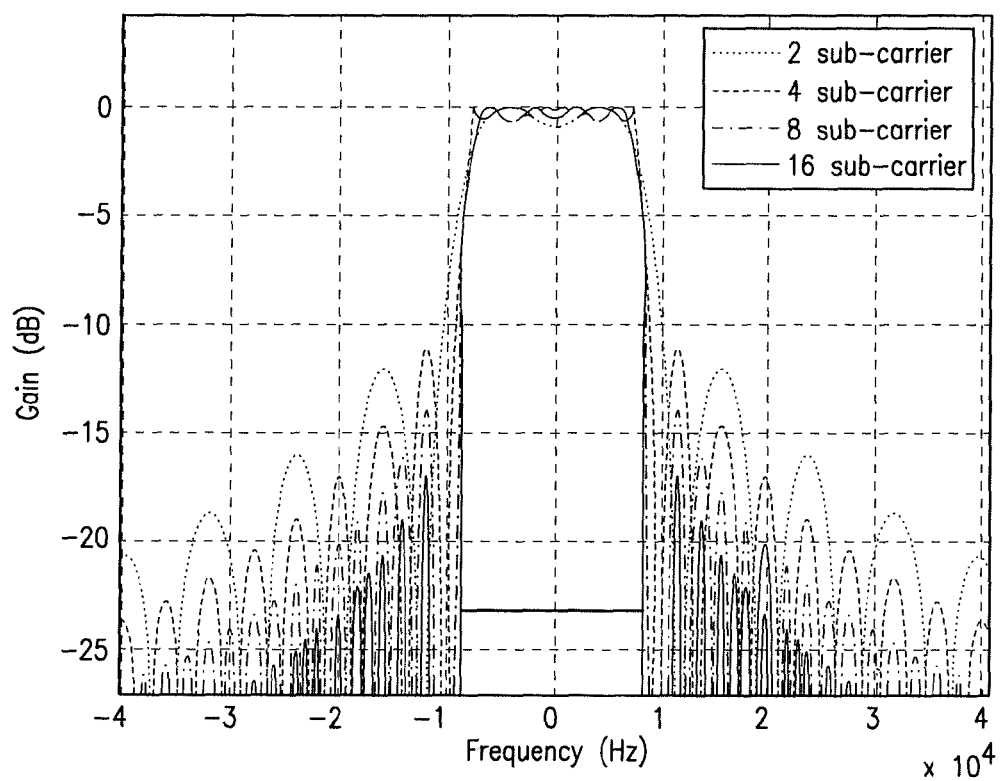
FIG. 6 is a graph showing gain as a function of frequency for 2, 4, 8, and 16 sub-carrier systems.

Next, the spectrum of each of these waveforms can be calculated. FIG. 6 shows the spectrum for each of these possible waveforms. It can be seen that none of these waveforms would meet a typical spectrum mask or ACP requirement expected for a 10 KHz channel without the help of a spectrum shaping filter 121.

The frequency response of the spectrum shaping filter can be deemed:

$$H = F_{mask} - F_{waveform} \quad (1)$$

Where H is frequency response, $F_{mask}$ is the spectrum mask, and $F_{waveform}$ is the spectrum of the unshaped waveform.

Unlike in a conventional single carrier system, the spectrum shaping filter 121 does not need to be a Nyquist filter. The spectrum shaping filter can be a general FIR (Finite Impulse Response) lowpass filter and can be designed based on its frequency response. It is up to the designer to choose the method, such as a least squares method or a window method.

Next, after the parameters of the spectrum shaping filter 121 are derived, a cyclical prefix (CP) length can be calculated. The CP should be longer than the sum of the length of the spectrum shaping filter and the delay spread of the channel (i.e., ISI) and should not significantly degrade performance. Thus, for example, for the 2, 4, 8, and 16 sub-carrier waveforms under consideration in this particular example, the CP length settings may be:

| 2 sub-carriers | CP = 125 us, CP = 1/1 symbol length |
| 4 sub-carriers | CP = 125 us, CP = 1/2 symbol length |
| 8 sub-carriers | CP = 62.5 us, CP = 1/8 symbol length |
| 16 sub-carriers | CP = 62.5 us, CP = 1/16 symbol length |

Other lengths could be selected for each number of sub-carriers, however, it is most convenient to select a length for which the symbol length is an integer multiple thereof. Above we have chosen to consider for each of the four potential sets of sub-carriers the shortest length that is longer than the sum of the filter length and ISI for which the symbol length is an integer multiple thereof.

Using the'above-described exemplary method, all of the waveform parameters may be calculated. The next step is to select settings for CP length, sub-carrier spacing, and spectrum shaping filter parameters with the best trade-off. Small sub-carrier spacing takes less CP overhead, but suffer more Doppler spreading. Settings with modest CP overhead and good performance in Doppler spreading should be chosen. In this example, for a 25 KHz channel, an 8 sub-carrier waveform provides a good compromise.

In any event, after the signal is filtered in spectrum shaping block 121, the signal is converted from digital to analog, such as via a DAC (Digital to Analog Converter), and modulated onto an RF carrier frequency in block 123. Finally, the signal is provided to a radiating antenna 125 for over the air radio transmission.

Figure 2:
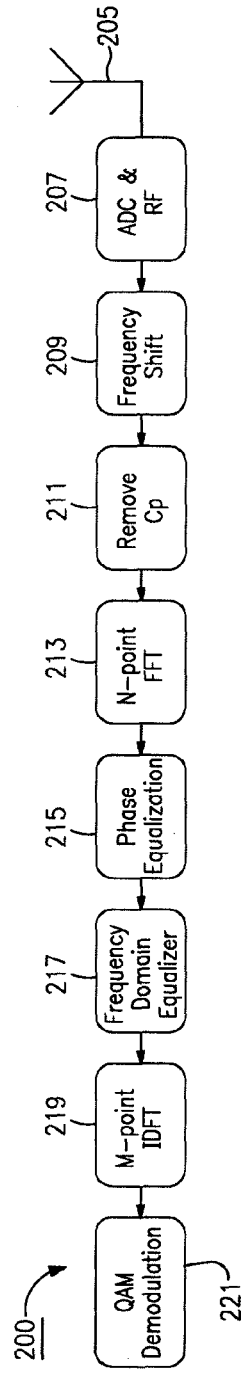
FIG. 2 is a block diagram illustrating the components of an SC-FDMA receiver in accordance with the principles of the present disclosure.

Turning now to the receiving side of the system, FIG. 2 is a block diagram illustrating the major components of a receiver 200 corresponding to the communication scheme discussed herein and the transmitter of FIG. 1. Particularly, a signal is received on an antenna 205 and provided to block 207, which includes an RF demodulator to remove the carrier frequency and convert the signal back to baseband and an ADC (Analog to Digital Converter). The demodulated, digital signal is passed to a frequency shift block 209. Frequency shift block 209 corresponds to frequency shift block 119 in the transmitter 100. Particularly, it shifts the sub-carrier frequencies within the channel back by one-half the subcarrier frequency spacing. These functions may be performed, for instance, in a DSP or suitably programmed microprocessor. Then, the signal is passed to a cyclical prefix removal block 211. This function removes the cyclical prefix added in block 117 of the transmitter 100. These functions may be performed, for instance, in a DSP or suitably programmed microprocessor.

In any event, next, the digital, time-domain data is converted to the frequency domain using an N-point FFT (Fast Fourier Transform) 211. The frequency domain signal data is then input to a phase equalization stage 215. Particularly, as a result of the frequency shift performed in block 119 of the transmitter, each of the subcarriers is also phase shifted. Accordingly, the receiver 200 should phase equalize the signal data before it attempts to perform channel equalization on the signal data. Various techniques for phase equalization of a received RF signal are known and require no further discussion herein. Both of the FFT 211 and phase equalization 213 functions may be performed, for instance, in a DSP or suitably programmed microprocessor.

Next, a frequency domain equalizer 217 performs channel equalization using the pilot structure as previously described. Next, in block 219, the phase and frequency equalized data is converted back to the time domain by M-point IDFT (Inverse Discrete Fourier Transform). Both of these functions may be performed, for instance, in a DSP or suitably programmed microprocessor.

Finally, the phase and channel-gain equalized data is fed into a QAM demodulator 221, which demodulates the data and provides it to, for instance, a digital processor for all further processing that is necessary, and the actual intended use of the signal data. For example, for voice data, it is processed, converted to analog, and forwarded to a speaker so that a user can listen to it.

Figure 5:
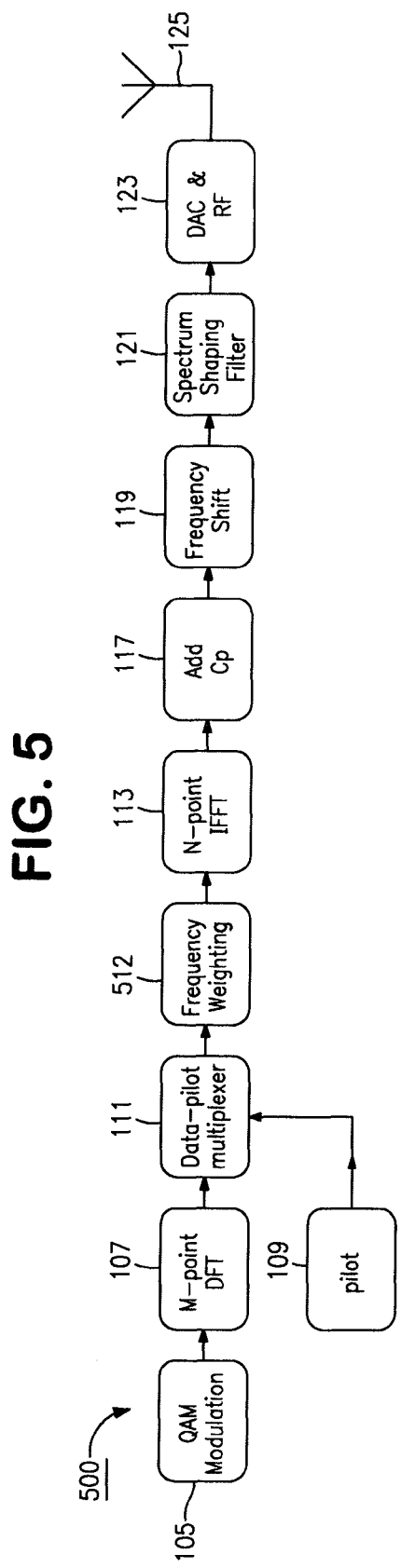
FIG. 5 is a block diagram of an SC-FDMA transmitter in accordance with an alternate embodiment of the present disclosure.

FIG. 5 illustrates an alternate embodiment of a transmitter to the one shown in FIG. 1. Most of the components are the same and, accordingly, have been labeled with the same reference numerals and are not discussed further here. The primary difference between the transmitter 500 of FIG. 5 and the transmitter 100 of FIG. 1 is that the circular diversity filter 115 of the FIG. 1 embodiment is removed and, instead, weighting of the frequency bins is performed in the frequency domain in order to increase both frequency diversity and time diversity of the data signal. This is shown in block 512, which is positioned between the M-point DFT block 107 and the N-point IFFT block 113 because this function is performed in the frequency domain. It is performed on the entire block, after the pilot structure has been added in the data-pilot multiplexer 111. The functions in block 512 can be performed using a suitably programmed microprocessor or DSP. Any reasonable algorithm for weighting the frequency bins in order to increase diversity in frequency, time, or both may be used. Suitable algorithms will be readily apparent to persons of skill in the related arts.

No particular changes would be necessitated in the receiver in accordance with this embodiment.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of communicating wirelessly comprising:
creating a plurality of sub-carrier data signals by quadrature amplitude modulating data onto a plurality of sub-carrier frequencies spaced apart by a sub-carrier frequency spacing interval;
converting the plurality of sub-carrier data signals to the frequency domain to create a plurality of frequency bin signals;
in the frequency domain, adding pilot symbols at equidistant time points within the plurality of sub-carrier data signals so that each pilot symbol pattern exclusively comprises during a given time period
first pilot symbol information to be transmitted during a first time interval by using a first sub-carrier data signal with a first frequency dimension,
second pilot symbol information to be transmitted during a second time interval succeeding the first time interval by using a second sub-carrier data signal that is immediately adjacent to the first sub-carrier data signal and that has a second frequency dimension lower than the first frequency dimension, and
third pilot symbol information to be transmitted during a third time interval succeeding the first time interval by using a third sub-carrier data signal that is immediately adjacent to the first sub-carrier data signal and that has a third frequency dimension higher than the first frequency dimension, where the period between the first and second time intervals is the same as the period between the second and third time intervals;
converting the weighted frequency bin signals back to the time domain;
frequency shifting the sub-carrier data signals by one half of the sub-carrier frequency spacing interval;
modulating the sub-carrier data signals onto a radio frequency carrier wave for wireless transmission;
receiving the sub-carrier data signals wirelessly;
frequency shifting the received sub-carrier data signals by one half of the sub-carrier frequency spacing interval in a direction opposite the direction in which the sub-carrier data signals were previously shifted; and
determining a phase difference of the channel response of adjacent sub-carriers using in combination said pilot bits in said first and second sub-carrier;
phase equalizing the received sub-carrier data signals based on said phase difference.

2. The method according to claim 1, further comprising spectrum shaping the plurality of sub-carrier signals.

3. The method according to claim 2, wherein the spectrum shaping comprises applying the sub-carrier signals to a spectrum shaping filter in the digital domain.

4. The method according to claim 2, wherein the spectrum shaping is performed after the frequency shifting.

5. The method according to claim 2, further comprising adding frequency diversity to the plurality of sub-carrier signals.

6. The method according to claim 5, wherein the adding of frequency diversity comprises applying the plurality of sub-carrier data signals to a circular diversity filter in the digital domain.

7. The method according to claim 6, wherein the adding of circular diversity is performed prior to the frequency shifting.

8. The method according to claim 1, further comprising adding at least frequency diversity to the plurality of sub-carrier data signals.

9. The method according to claim 1, wherein the converting back to the time domain is performed before the frequency shifting.

10. The method according to claim 1, further comprising weighting the frequency bin signals so as to increase frequency diversity in the time domain.

11. The method according to claim 2, further comprising:
in the frequency domain, weighting the frequency bin signals so as to increase frequency diversity of the sub-carrier data signals in the time domain.

12. The method of claim 1, wherein the pilot bits are added alternately in the first and second sub-carrier frequencies.

13. The method according to claim 1, further comprising:
converting the received sub-carrier data signals from the time domain to the frequency domain before phase equalizing;
frequency equalizing the received sub-carrier signals in the frequency domain; and
converting the phase and frequency equalized sub-carrier data signals back to the time domain.

14. A method of communicating wirelessly, comprising:
creating a plurality of sub-carrier data signals by quadrature amplitude modulating data onto a plurality of sub-carrier frequencies spaced apart by a sub-carrier frequency spacing interval;
adding pilot symbols at equidistant time points within the plurality of sub-carrier data signals so that each pilot symbol pattern exclusively comprises during a given time period
first pilot symbol information to be transmitted during a first time interval by using a first sub-carrier data signal with a first frequency dimension,
second pilot symbol information to be transmitted during a second time interval succeeding the first time interval by using a second sub-carrier data signal that is immediately adjacent to the first sub-carrier data signal and that has a second frequency dimension lower than the first frequency dimension, and
third pilot symbol information to be transmitted during a third time interval succeeding the first time interval by using a third sub-carrier data signal that is immediately adjacent to the first sub-carrier data signal and that has a third frequency dimension higher than the first frequency dimension, where a period between the first and second time intervals is the same as the period between the second and third time intervals;
modulating the sub-carrier data signals onto a radio frequency carrier wave for wireless transmission;
receiving the sub-carrier data signals wirelessly;
determining a phase difference of the channel response of the first and second sub-carrier signals using in combination said pilot bits in said first and second sub-carrier; and
phase equalizing the received first and second sub-carrier data signals based on said phase difference.

15. A method of communicating wirelessly, comprising:
creating a plurality of sub-carrier signals by quadrature amplitude modulating data onto a plurality of sub-carrier frequencies spaced apart by a sub-carrier frequency spacing interval;
adding at least frequency diversity to the plurality of sub-carrier signals;
adding pilot symbols at equidistant points within the plurality of sub-carrier signals so that each pilot symbol pattern exclusively comprises during a given time period
first pilot symbol information to be transmitted during a first time interval by using a first sub-carrier data signal with a first frequency dimension,
second pilot symbol information to be transmitted during a second time interval succeeding the first time interval by using a second sub-carrier signal that is immediately adjacent to the first sub-carrier data signal and that has a second frequency dimension lower than the first frequency dimension, and
third pilot symbol information to be transmitted during a third time interval succeeding the first time interval by using a third sub-carrier that is immediately adjacent to the first sub-carrier signal and that has a third frequency dimension higher than the first frequency dimension, where a period between the first and second time intervals is the same as a period between the second and third time intervals;
modulating the sub-carrier signals onto a radio frequency carrier wave for wireless transmission;
receiving the sub-carrier data signals wirelessly;
determining a phase difference of the channel response of adjacent sub-carriers using said pilot bits in said first and second sub-carrier;
phase equalizing the received sub-carrier data signals based on said phase difference.

16. The method according to claim 15, wherein the adding comprises:
converting the plurality of sub-carrier signals to the frequency domain to create a plurality of frequency bin signals;
weighting the frequency bin signals so as to increase frequency diversity in the time domain; and
converting the weighted frequency bin signals back to the time domain.

17. The method according to claim 15, further comprising spectrum shaping the plurality of sub-carrier signals.

18. The method according to claim 17, wherein the spectrum shaping comprises applying the sub-carrier signals to a spectrum shaping filter in the digital domain.

19. The method according to claim 15, wherein the adding of frequency diversity comprises applying the plurality of sub-carrier signals to a circular diversity filter in the digital domain.

20. A method of receiving a wireless signal, the wireless signal comprising a plurality of quadrature amplitude modulated sub-carrier data signals, each sub-carrier data signal on a sub-carrier frequency, the sub-carrier frequencies spaced apart by a sub-carrier frequency spacing interval and frequency shifted by one half of the sub-carrier frequency spacing interval, the method comprising:
receiving a signal comprising a plurality of sub-carrier data signals wirelessly;
frequency shifting the received sub-carrier signals by one half of the sub-carrier frequency spacing interval;
determining a phase difference of a channel response for said plurality of sub-carriers data signals which are closely spaced or adjacent using pilot symbols which have been added at equidistant time points to said plurality of sub-carrier data signals so that each pilot symbol pattern exclusively comprises during a given time period
first pilot symbol information transmitted during a first time interval by using a first sub-carrier data signal with a first frequency dimension,
second pilot symbol information transmitted during a second time interval succeeding the first time interval by using a second sub-carrier data signal that is immediately adjacent to the first sub-carrier data signal and that has a second frequency dimension lower than the first frequency dimension, and
third pilot symbol information transmitted during a third time interval succeeding the first time interval by using a third sub-carrier data signal that is immediately adjacent to the first sub-carrier data signal and that has a third frequency dimension higher than the first frequency dimension, where a period between the first and second time intervals is the same as a period between the second and third time intervals; and
phase equalizing the received first and second sub-carrier data signals based on said phase difference.

21. The method according to claim 20, further comprising:
converting the received sub-carrier data signals from the time domain to the frequency domain before phase equalizing;
frequency equalizing the received sub-carrier signals in the frequency domain; and converting the frequency equalized sub-carrier signals back to the time domain.

22. The method according to claim 20, further comprising quadrature amplitude demodulating the received sub-carrier data signals after the frequency equalizing and the phase equalizing.

23. An apparatus for communicating a signal wirelessly via a plurality of sub-carrier data signals spaced apart by a sub-carrier frequency spacing interval comprising:
   a wireless transmitter for transmitting the plurality of sub-carrier data signals, including:
      a multi-carrier quadrature amplitude modulator;
      a frequency shifting circuit adapted to shift the sub-carrier signals by one half of the sub-carrier frequency spacing interval; and
      a modulator adapted to modulate the sub-carrier signals onto a radio frequency carrier wave for wireless transmission; and
   a wireless receiver for receiving the sub-carrier data signals comprising:
      a frequency shifting circuit adapted to frequency shift the received sub-carrier signals by one half of the sub-carrier frequency spacing interval in a direction opposite the direction in which the sub-carrier frequency signals were shifted prior to wireless transmission; and
      a phase equalizer configured to determine a phase difference of a channel response for at least a first and second ones of said plurality of sub-carriers data signals which are closely spaced or adjacent by using in combination pilot symbols which have been added at equidistant time points to said plurality of sub-carrier data signals so that each pilot symbol pattern exclusively comprises during a given time period
         first pilot symbol information transmitted during a first time interval by using a first sub-carrier data signal with a first frequency dimension,
         second pilot symbol information transmitted during a second time interval succeeding the first time interval by using a second sub-carrier data signal that is immediately adjacent to the first sub-carrier data signal and that has a second frequency dimension lower than the first frequency dimension, and
         third pilot symbol information transmitted during a third time interval succeeding the first time interval by using a third sub-carrier data signal that is immediately adjacent to the first sub-carrier data signal and that has a third frequency dimension higher than the first frequency dimension, where a period between the first and second time intervals is the same as a period between the second and third time intervals.

24. The apparatus according to claim 23, further comprising a digital domain spectrum shaping filter.

25. The apparatus according to claim 23, further comprising a circular diversity filter.

26. The apparatus according to claim 23, wherein said wireless transmitter further comprises:
   a Fourier transform circuit coupled to transform the plurality of sub-carrier data signals to the frequency domain to create a plurality of frequency bin data points;
   a weighting circuit coupled to weight the frequency bin signals so as to increase frequency diversity in the time domain; and
   an inverse Fourier transform circuit coupled to transform the weighted frequency bin signals back to the time domain.

27. The apparatus according to claim 23, wherein said wireless transmitter further comprises:
   a Fourier transformer circuit coupled to transform the plurality of sub-carrier data signals to the frequency domain to create a plurality of frequency bin data points;
   a frequency equalizer adapted to weight the frequency bin signals so as to increase frequency diversity in the time domain; and
   an inverse Fourier transform circuit coupled to transform the weighted frequency bin signals back to the time domain.

* * * * *